United States Patent [19]

Slone

[11] Patent Number: 5,342,599
[45] Date of Patent: Aug. 30, 1994

[54] SURFACE STABILIZED SOURCES OF ISOCYANIC ACID

[75] Inventor: Ralph J. Slone, Columbus, Ind.

[73] Assignee: Cummins Power Generation, Inc., Columbus, Ind.

[21] Appl. No.: 626,059

[22] Filed: Dec. 11, 1990

Related U.S. Application Data

[63] Continuation-in-part of Ser. No. 582,477, Sep. 14, 1990, abandoned.

[51] Int. Cl.$^5$ .............................................. C01C 3/14
[52] U.S. Cl. ..................................... 423/365; 423/236
[58] Field of Search ....................... 423/364, 365, 236

[56] References Cited

U.S. PATENT DOCUMENTS

| | | |
|---|---|---|
| 3,746,498 | 7/1973 | Stengel . |
| 3,900,554 | 8/1975 | Lyon . |
| 3,914,390 | 10/1975 | Kudo et al. . |
| 4,028,275 | 7/1977 | Sakai et al. . |
| 4,080,425 | 3/1978 | Tanaka et al. . |
| 4,199,554 | 4/1980 | Araki et al. . |
| 4,208,386 | 6/1980 | Arand et al. . |
| 4,212,853 | 7/1980 | Fukui . |
| 4,216,191 | 8/1980 | Klemann et al. ................... 423/364 |
| 4,325,924 | 4/1982 | Arand et al. . |
| 4,335,084 | 6/1982 | Brogan . |
| 4,350,669 | 9/1982 | Izumi et al. . |
| 4,368,057 | 1/1983 | Matthews . |
| 4,372,933 | 2/1983 | Kyung et al. . |
| 4,372,934 | 2/1983 | Kyung et al. . |
| 4,395,223 | 7/1983 | Okigami et al. . |
| 4,432,959 | 2/1984 | Shimamura et al. ................. 423/365 |
| 4,507,270 | 3/1985 | Harth et al. .......................... 423/365 |
| 4,585,632 | 4/1986 | Schneider et al. . |
| 4,645,652 | 2/1987 | Kimura . |
| 4,649,038 | 3/1987 | Labes et al. ......................... 423/364 |
| 4,719,092 | 1/1988 | Bowers . |
| 4,731,231 | 3/1988 | Perry . |
| 4,731,233 | 3/1988 | Thompson et al. . |
| 4,800,068 | 1/1989 | Perry . |
| 4,851,201 | 7/1989 | Heap et al. . |
| 4,861,567 | 8/1989 | Heap et al. . |
| 4,886,650 | 12/1989 | Perry . |
| 4,908,193 | 3/1990 | Perry . |
| 4,966,817 | 10/1990 | Labes et al. ......................... 423/364 |
| 4,980,040 | 12/1990 | Lichtin et al. . |
| 5,078,980 | 1/1992 | Müllner et al. ...................... 423/365 |

FOREIGN PATENT DOCUMENTS

| | | |
|---|---|---|
| 639883 | 4/1962 | Canada ............................... 423/236 |
| 654427 | 12/1962 | Canada . |
| 54-28771 | 3/1979 | Japan . |
| 54-46172 | 4/1979 | Japan . |
| 199633 | 4/1989 | Japan . |

OTHER PUBLICATIONS

Perry, "Kinetics of the Reactions of NCO Radicals with H$_2$ and NO Using Laser Photolysis-Laser Induced Fluorescence," 82 *J. Chem. Phys.* 5485 (1985).
Perry, "NO$_x$ Reduction Using Cyanuric Acid: Pilot Scale Testing," (date unknown) WSS/CI 88-68.
Perry and Siebers, "Rapid Reduction of Nitrogen Oxides in Exhaust Gas Streams," 324 *Nature* 657 (1986).
Muzio and Arand, "Homogeneous Gas Phase Decomposition of Oxides of Nitrogen" PB-257 555 (1976).

(List continued on next page.)

*Primary Examiner*—Wayne Langel
*Attorney, Agent, or Firm*—Woodard, Emhardt, Naughton, Moriarty & McNett

[57] ABSTRACT

Composition, method and apparatus for providing a surface stabilized source of HNCO by adsorbing gaseous or liquid HNCO on the surface of a substrate. HNCO stabilized in this manner is not reactive and is stable at or above ambient temperature. The HNCO can be provided by heating a reactant source material, such as urea. The substrate can be heated to release HNCO. The present invention is especially useful as a source of HNCO for reducing NO$_x$ in gas streams.

13 Claims, 2 Drawing Sheets

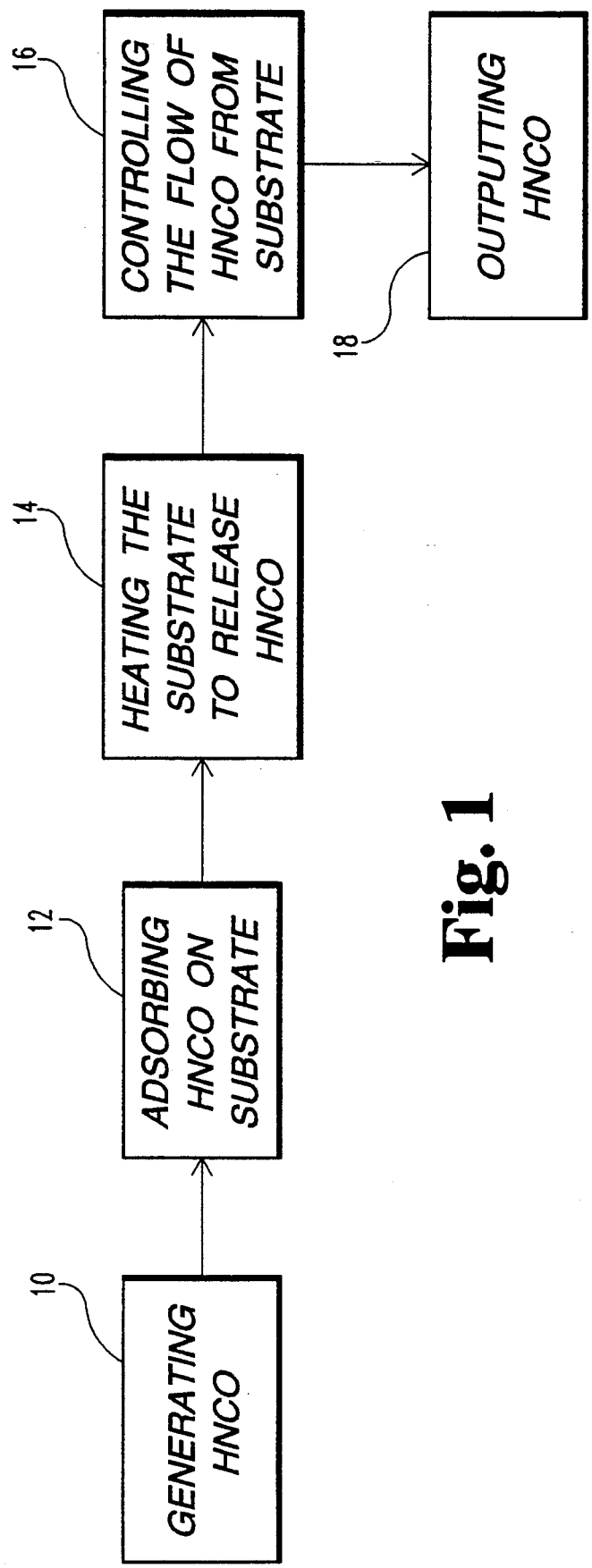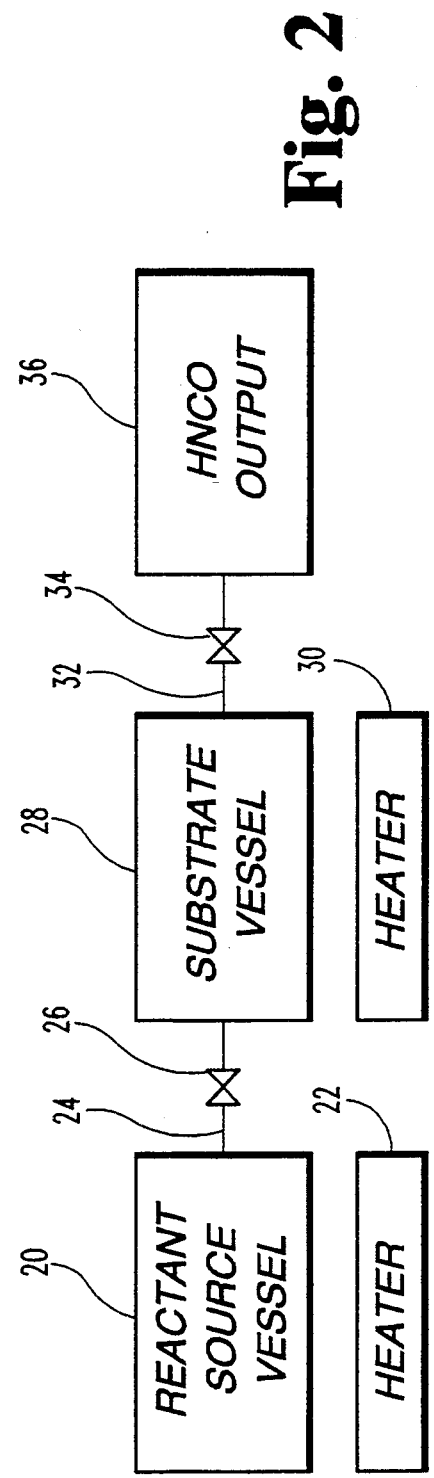

SURFACE STABILIZED SOURCES OF ISOCYANIC ACID

CROSS-REFERENCE TO RELATED APPLICATIONS

This application is a continuation-in-part of U.S. Ser. No. 07/582,477, entitled *Process and Apparatus For Removing $NO_x$ From Gas Streams*, filed by Ralph J. Slone, on Sep. 14, 1990, now abandoned.

FIELD OF INVENTION

The present invention relates to compositions, methods and apparatus for storing isocyanic acid (HNCO) on a substrate in stable form at or above ambient temperature. Isocyanic acid can then be delivered for use as a reactant without intermediate steps simply by heating the substrate to the release temperature.

BACKGROUND OF THE INVENTION

Recent emphasis on ecological concerns in the environment has spawned many efforts to solve the world's air pollution problems. Two major concerns worth noting are acid rain and photochemical smog. While many compounds contribute to theses problems, $NO_x$ plays an important role, imposing a significant threat to the environment and human health.

$NO_x$ is a family of compounds of nitrogen and oxygen, primarily, NO and $NO_2$. $NO_x$ comes from a variety of sources, most notably cars, trucks and industrial plants. Specifically, $NO_x$ is produced by high temperature combustion systems, metal cleaning processes, and the production of fertilizers, explosives, nitric acid, and sulfuric acid. In many urban environments, automobiles and diesel engine trucks are the major sources of $NO_x$.

NO is the stable oxide of nitrogen at combustion temperatures. Hence, it is more abundantly produced than $NO_2$. However, at atmospheric conditions, the equilibrium between NO and $NO_2$ favors $NO_2$. Therefore, the effective control of $NO_x$ concerns both the control and removal of both NO and $NO_2$ from exhaust gas streams.

Recently, methods of $NO_x$ reduction involving exposure of a gas stream containing $NO_x$ to HNCO have been disclosed. HNCO, also known as isocyanic acid, is an unstable, highly reactive, polymerizable gas at ordinary temperatures and pressures, and is a lachrymator, and thus is hard to handle and store. Free HNCO gas is unstable at temperatures ranging from about 25° F. to about 450° F., tending to polymerize within this range. Free HNCO liquid is unstable above 25° F. (−4° C.). Thus, free HNCO must be stored at temperatures and pressures outside its unstable ranges. As is known in the art, the precise temperature at which HNCO becomes stable in the liquid and gas phases is also dependent upon factors such as pressure and concentration.

HNCO also can be stabilized at ambient temperatures by bonding it to organic groups or molecules (forming an organic isocyanate), or by trimerizing it to form cyanuric acid. Cyanuric acid decomposes when heated, forming HNCO. The conversion of cyanuric acid to HNCO takes place at relatively high temperatures, such as from about 650° to about 1400° F.

There are disadvantages to the prior art methods for stabilizing HNCO. The high or low temperatures and low pressures required to store free HNCO require expensive and large equipment. The organic substituents used to form organic isocyanates can generate extraneous and sometimes unacceptable compounds upon decomposition of the substituted HNCO or require excessive decomposition temperatures.

Adsorption (or, more broadly, reversible bonding) of an active material on a substrate is widely used in both liquid and gas phase treatments. Adsorption is the ability of a substance or substrate to hold or concentrate gases or liquids upon its surface. Liquid-phase applications include decolorizing, drying, purification, salt removal, and odor, taste and color removal. Gas-phase applications include separations, solvent recovery, dehydration and odor removal.

SUMMARY OF THE INVENTION

The invention is an improved composition, method and apparatus for storing HNCO in more stable form for later use, and for releasing the stored HNCO to provide a source of free HNCO. It has been discovered that HNCO bonded on the surface of a substrate (also known herein as a "surface stabilized source of HNCO") is a stable composition at ambient temperature and pressure. HNCO bonded on a substrate is defined herein as "stable" if the bonded HNCO decomposes or polymerizes at a slower rate than free HNCO stored at the same temperature and pressure.

Substrates useful for storing HNCO include molecular sieves or zeolites, activated charcoals, metallic hydrides, and ion exchange resins. Relevant properties for substrates, in addition to surface chemistry, include porosity or void fraction, density, and surface area.

With porous material such as zeolites, two of the most important characteristics are the pore size of the crystal lattice structure and surface chemistry. The pore or void or "cage" size of a zeolite structure physically controls access to the molecules of the substrate surface. The surface chemistry within the voids preferentially attracts the desired molecules, in the present invention HNCO, resulting in the desired bonding. The pore sizes and surface chemistry of zeolites are predictable based on the particular composition and synthesis conditions, and can be changed and/or controlled by modifying the composition and/or synthesis conditions. Thus, zeolites are useful because only molecules of the appropriate size are able to occupy the voids in the crystal lattice, and these voids and the surface chemistry within the voids can be engineered by modifying the structure of the zeolite to provide a surface which will preferentially attract HNCO.

In another aspect of the present invention, HNCO can be controllably released by heating a substrate having bonded HNCO. The release can be contained in a vessel having a heat source. The flow of HNCO can be regulated by varying the amount of heat applied to the vessel, the vessel pressure, and/or the flow of air or other carrier gases through the vessel. Generally, lowering the partial pressure of gaseous HNCO in the vessel stabilizes HNCO released from the substrate surface and enhances the physical transfer of the released HNCO molecules away from the surface, thereby reducing the rates of re-adsorption and/or polymerization. In embodiments in which the release temperature of the HNCO from the surface is below the temperature at which free HNCO is stable as a gas, the flow of air or other carrier gases also stabilizes the released HNCO by lowering its partial pressure and thus reducing its rate of polymerization. The release of HNCO thus can be controlled by regulating the heat source and vessel pressure.

The use of a surface stabilized source of HNCO eliminates the need for cyanuric acid as a starting material. This is desirable because cyanuric acid must be conveyed to a reactor in solid form, vaporized, and then decomposed at a high temperature to form HNCO. The present invention makes these intermediate steps and the accompanying time delay unnecessary. The delivery of HNCO can thus be controlled flexibly in response to rapidly fluctuating demand. HNCO can be produced in advance directly from urea, which is less costly than cyanuric acid, or from an alternative source and can be stored on a substrate. The stored HNCO can be released from the substrate in a controlled and desirable manner. Thus, the composition, method and apparatus disclosed herein are useful to store and deliver HNCO as a part of any process that employs HNCO as a reactant.

BRIEF DESCRIPTION OF THE DRAWINGS

FIG. 1 is a flow diagram of the method of the present invention.

FIG. 2 is a schematic diagram of the apparatus of the present invention.

DETAILED DESCRIPTION OF THE INVENTION

Figure 3:
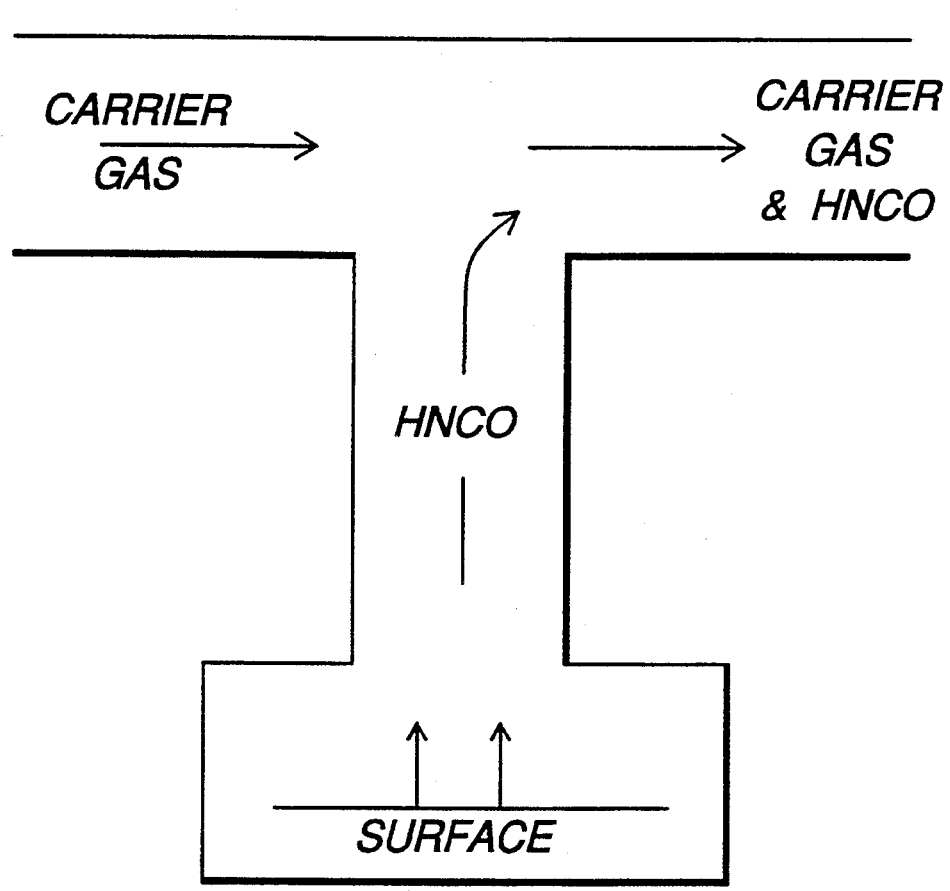
FIG. 3 is a diagram of an educator useful with the present invention.

While the invention will be described in connection with certain preferred embodiments, it will be understood that the invention is not limited to those embodiments. On the contrary, the invention comprehends all alternatives, modifications, and equivalents as may be included within the spirit and scope of the invention as defined by the appended claims.

The composition of the present invention comprises HNCO bonded on a substrate. Broadly, any substrate which bonds a useful quantity of gaseous or liquid HNCO and improves its stability while bonded is contemplated for use herein.

The technical strategy employed here for reversibly bonding HNCO on a substrate is as follows. The substrate surface is designed to bond and/or attract free HNCO at one temperature and to release the HNCO at a second, higher temperature. This strategy can be carried out by providing a substrate surface which forms stronger bonds with HNCO at a lower temperature, selected as the storage temperature, than at a higher temperature, selected as the release temperature. At the higher release temperature the bonds are such that the HNCO is controllably released from the substrate surface. These bonds are contemplated to be electronic in nature, and may be of intermediate strength or stability, with the bonding strength or stability between the bonding strength or stability of adsorbed species and the bonding strength or stability of fully bonded elements in a stable chemical compound. These are not bonds which define classical chemical compounds, and may not be as strong as the internal chemical bonds which hold together the isocyanic acid molecule, but the bonds are sufficient to electronically or chemically stabilize the HNCO. One of the ways of implementing this strategy is by designing the substrate surface to have desirable surface chemistry such that HNCO molecules are preferentially attracted and/or bonded to the surface molecules.

In addition, the substrate surface can be designed to have crevices, cages, or pores of controlled size which control or "sort" molecules, predominantly by physical size, to selectively allow certain molecules to have access to the bonding surface. In that species other than HNCO may be undesirably attracted to a particular bonding surface, the physical sorting mechanism allows for a wider selection of bonding surfaces by reducing the interference created by undesired surface bonding. With appropriate selection of the physical characteristics and surface chemistry of the substrate surface, HNCO molecules can be preferentially stored at the desired storage temperature and preferentially released at the desired release temperature. Applying this technical strategy, a surface can be designed which stably stores HNCO at a desired storage temperature, yet allows for controllable release of the stored HNCO at a desired release temperature.

One category of substrates contemplated herein is ion exchange resins. Ion exchange resins are contemplated to be useful for carrying out the bonding strategy defined above. An exemplary anionic exchange resin is a dimethylamine-functionalized chloromethylated copolymer of styrene and divinylbenzene. This resin is sold under the trade name DOWEX MWA-1 by Dow Chemical U.S.A., an operating unit of The Dow Chemical Co., Midland, Mich. (DOWEX is a registered trademark.) Another exemplary anionic exchange resin is a trimethylamine functionalized chloromethylated copolymer of styrene and divinylbenzene in the hydroxide form, sold under the trade name DOWEX SBR by Dow Chemical U.S.A. An exemplary cationic exchange resin is a sulfonated copolymer of styrene and divinylbenzene in the sodium form, sold under the trade name DOWEX HCR by Dow Chemical U.S.A.

Another category of substrates contemplated herein is a physically absorbent medium, such as a zeolite or other type of molecular sieve. Zeolites are primarily contemplated to be useful for carrying out the technical strategy defined above. Zeolites are generally classified by their pore sizes; one of ordinary skill in the art can readily determine the optimal pore size for a particular type of zeolite (depending on its chemistry, particle size, the storage chamber size and shape, etc.) to preferentially allow physical access of HNCO at the desired storage temperature. With the appropriate composition and synthesis conditions, the physical characteristics of the voids as well as the surface chemistry within the voids can be controlled to preferentially bond HNCO molecules.

A zeolite substrate can be modified to provide a surface for preferentially bonding HNCO at a desired storage temperature, and releasing the HNCO at a desired release temperature. For example, in an aluminosilicate crystal structure:

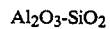

$Al_2O_3-SiO_2$ (discussed in greater detail below), a change in the alumina-silica ratio is expected to predictably change the surface bonding strength of the HNCO molecules to the substrate, along with an accompanying change in the release temperature. Representative zeolites contemplated for use herein (subject to the necessary optimization) include zeolites with effective pore openings of from about 3 to about 10 angstroms.

A representative zeolite with a three angstrom effective pore size is an alkali aluminosilicate which is the potassium form of the Type A crystal structure, having the chemical formula:

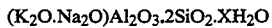
$(K_2O.Na_2O)Al_2O_3.2SiO_2.XH_2O$

An exemplary commercial zeolite of this type is ZEO-CHEM molecular sieve, Type 3A, sold by Zeochem, Louisville, Ky., which is a joint venture of Chemische Fabrik Uetikon and United Catalysts, Inc. (ZEOCHEM is a registered trademark).

A representative zeolite with a four angstrom effective pore size is an alkali aluminosilicate which is the sodium form of the Type A crystal structure, having the chemical formula:

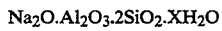
$Na_2O.Al_2O_3.2SiO_2.XH_2O$

An exemplary commercial zeolite of this type is ZEO-CHEM molecular sieve, Type 4A, sold by Zeochem.

A representative zeolite with a five angstrom effective pore size is an alkali aluminosilicate which is the calcium form of the Type A crystal structure, having the chemical formula:

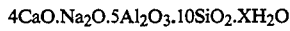
$4CaO.Na_2O.5Al_2O_3.10SiO_2.XH_2O$

An exemplary commercial zeolite of this type is ZEO-CHEM molecular sieve, Type 5A, sold by Zeochem.

A representative zeolite with a ten angstrom effective pore size is an alkali aluminosilicate which is the sodium form of the Type X crystal structure, having the chemical formula:

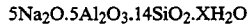
$5Na_2O.5Al_2O_3.14SiO_2.XH_2O$

An exemplary commercial zeolite of this type is ZEO-CHEM molecular sieve, Type 13X, sold by Zeochem.

Yet another category of substrates contemplated herein is activated charcoal. Activated charcoal is contemplated to function both by trapping HNCO physically and by attracting HNCO chemically. It is believed that activated carbon presents a polar surface which will attract and partially bond the HNCO molecule. At least two forms of activated charcoal are contemplated for this invention: activated charcoal impregnated with metallic oxides and high surface area coconut shell derived activated carbon.

Activated charcoal impregnated with metallic oxides can be used to store HNCO and is physically strong, highly absorbent, and can be regenerated thermally. Regeneration restores the absorptive properties of this substrate. An exemplary activated charcoal impregnated with a metallic oxide is G-32W sold by United Catalysts, Inc. of Louisville, Ky. G-32W contains CuO (8.0%) and $CrO_3$ (4.5%). G-32W is sold in granular form.

Coconut shell derived activated charcoal can be used to store HNCO and can also be regenerated thermally. An exemplary coconut shell derived activated charcoal is G-32H sold by United Catalysts, Inc. G-32H has a high surface area and comes in granular form.

Yet another category of substrates contemplated herein is that of high porosity metals selected from precious metals, base metals and mixtures thereof that are devoid of surface bonded hydrogen, but are in the physical form which is known to be useful for storing hydrogen. HNCO can be stored on the surface in the same manner as hydrogen has previously been stored. This is predominantly an execution of the bonding strategy discussed above.

Precious metals contemplated herein include, but are not limited to, palladium. Base metals contemplated herein include, but are not limited to, alloys and mixtures of cobalt, iron, nickel, manganese, titanium, aluminum, and rare earth metals. Three exemplary base metal alloys contemplated herein are an alloy of 50% titanium, 44% iron, and 5% manganese; an alloy of mischmetal, nickel, and aluminum; and an alloy of mischmetal, nickel, and iron. Mischmetal is a known mixture of rare earth metals having a melting temperature of about 1198° F. (648° C.), prepared by electrolyzing a fused rare earth chloride mixture.

It is anticipated that any of the substrates mentioned above may need to be altered or engineered depending on the desired storage, and release temperatures and to avoid adverse catalytic effects. A higher release temperature requires a stronger bond between the substrate surface and the HNCO and vice versa. By selecting the appropriate substrate or engineering a substrate to suit one's needs, the practioner of the present invention achieves a controlled and desirable release temperature for HNCO.

FIG. 1 illustrates the process for absorbing HNCO on the surface of a substrate and releasing HNCO. In step 10, HNCO is generated in any manner, such as by heating any one of a variety of reactant sources. Several reactant sources contemplated herein include, but are not limited to, urea, isocyanuric acid, cyanuric acid, ammelide, ammeline, hydrazine, and mixtures thereof. Urea is preferred due to its stability and low cost.

In step 12, HNCO, generated in step 10, is brought into contact with the surface of a substrate, where it is bonded. The bonding conditions will depend upon the physical state of the HNCO. If the HNCO is in liquid form at low temperatures then the liquid HNCO must be bonded to the substrate at a low temperature and pressure. The substrate may then be carefully brought to ambient temperature and maintained at a low pressure until substantially all the HNCO is bonded and no liquid HNCO remains. Thereafter, the composition will be stable and will not release HNCO at any temperature below the release temperature of the substrate. If the HNCO is initially provided in gaseous form at a temperature exceeding about 450° F., then the gas must not be cooled below its stable temperature until bonding or attraction of the HNCO on the surface occurs. The surface stabilized HNCO can be stored for later use to supply HNCO. As is known in the art, the precise temperatures at which HNCO becomes stable in the liquid and gas phases are also dependent upon factors such as pressure and concentration.

In step 14, the stored HNCO is released by heating the substrate. The substrate temperature required to release HNCO will depend on the physical and chemical properties of the substrate, the concentration of HNCO on the substrate, the pressure to which the substrate is subjected, and other factors. Essentially, the release temperature is a function of the bond between the HNCO and the substrate surface. The release temperature can be controlled by choosing the appropriate substrate. The correct substrate choice and bonding conditions can be determined by one skilled in the art. The appropriately chosen substrate will not be damaged at the HNCO release temperature and pressure.

The release temperature can be from about 40° F. to about 1400° F. There is no precise critical maximum release temperature, although the release temperature should not exceed the temperature at which HNCO decomposes. Relatively low release temperatures are generally preferred in certain embodiments to minimize the energy used for heating the substrate. Specific release temperatures contemplated herein are from about 500° to about 1300° C., or from about 300° C. to about 900° C., or from about 50° C. to about 700° C. Specific pressures at release contemplated herein are from 40N/cm$^2$ (4 atm) to a near vacuum.

Step 16 is controlling the flow of HNCO released from the substrate surface. This step allows a controlled flow of HNCO for use as a reactant. The flow of HNCO can be controlled by varying the heat applied to the substrate, employing a control valve to limit HNCO flow and varying the pressure around the substrate. Lowering the overall pressure and partial pressure of HNCO will inhibit polymerization and increase the rate of release from the substrate.

Step 18 is outputting HNCO. For example, HNCO needed as a reactant for an NO$_x$ reduction process can be provided for reaction with a gas containing NO$_x$ to reduce its NO$_x$ content.

FIG. 2 illustrates an apparatus useful for storing HNCO and later delivering HNCO to a substrate. Broadly, the apparatus comprises a reactant source vessel 20, a heater 22 for heating the vessel 20, a conduit 24 controlled by a valve 26 and communicating between the outlet of the vessel 20 and the inlet of the substrate vessel 28, a heater 30 for heating the vessel 28, and a conduit 32 controlled by a valve 34 and connecting the outlet of the vessel 28 to an HNCO output 36. A substantial pressure drop can be provided by mounting an eductor at the HNCO outlet which passes a diluent gas, exhaust gas of an engine, or the like across the outlet of the vessel to maintain a low pressure in the substrate vessel.

An eductor useful with the present invention is illustrated in FIG. 3. The carrier gas can be inert, oxidizing or reducing, and in the preferred embodiment is air. The flow of the carrier gas across the orifice of the channel leading to substrate surface created a pressure drop between the substrate surface and the exit of the eductor. The pressure difference created by the eductor stabilizes the HNCO released from the surface by enhancing the physical transfer of the released HNCO molecules from the surface, thereby reducing the rate of re-adsorption or re-bonding to the surface. In embodiments in which the release temperature of the HNCO from the surface is below the temperature at which free HNCO is stable as a gas, the flow of the carrier gas also stabilizes the HNCO released from the surface in that the reduced partial pressure of the HNCO reduces the rate of polymerization. The temperature, pressure and flow rate of the carrier gas, as well as the physical characteristics of the eductor, can be optimized to control the release of HNCO for the particular application.

The selection of the reactant source vessel 20 will depend upon the reactant source material chosen, the manner and form in which the source material is stored, and the temperature and pressure required for the production of HNCO. It will be advantageous to use a reactant source vessel which employs both a heater 22 and a control valve 26. The heater 22 and the control valve 26 can be regulated to control the flow rate, temperature and pressure of HNCO delivered to the substrate vessel 28. A control valve 34 can be employed to regulate the flow of HNCO leaving the substrate vessel 28 after the reactant has been released from the substrate. A heater 30 can be employed to heat the substrate, thereby releasing HNCO.

An important aspect of the present invention is that the substrate vessel 28, the HNCO output 36, the reactant source vessel 20, and the substrate itself can be portable or fixed. Thus, the substrate vessel 28 can be charged with HNCO by connecting it to a reactant source vessel 20 at one location and then HNCO can be released from the substrate vessel 28 at a remote location. The present invention is applicable to both stationary and mobile systems and the reactant source vessel 20 need not be a part of a mobile system. It is contemplated that the HNCO stored on a substrate can also be handled and transported at an ambient temperature and pressure.

Thus, a composition, method and apparatus have been described and illustrated for storing HNCO on the surface of a substrate and making it available for release. This storage process results in a surface stabilized reactant source from which HNCO can be released when the substrate is heated. This invention is useful because it provides a way to store unstable and reactive substances like HNCO at ambient temperatures without the use of expensive and bulky equipment. Then, substances like HNCO can be delivered as a reactant without performing intermediate steps.

EXAMPLE 1

Urea is placed in a vessel equipped with a heater and outlet. The vessel is heated to 400° C. (752° F.) and the urea decomposes into isocyanic acid (with ammonia as a by-product). At this point, the HNCO, in gaseous form, leaves the vessel through the outlet, passes through a control valve and enters a substrate vessel containing an zeolite surface of ZEOCHEM molecular sieve, Type 5A, sold by Zeochem of Louisville, Ky. The zeolite surface is maintained at about 250° C. (about 480° F.) and atmospheric pressure. The HNCO is bonded to the zeolite surface. Once the zeolite surface is saturated with HNCO, the control valve between the reactant source vessel and substrate vessel is closed. The temperature of the substrate and bonded HNCO is then lowered to a temperature of about 20° C. (about 70° F.). The HNCO remains bonded and stable at this temperature.

At a later time, the substrate is heated to about 400° C. (about 750° F.) by heating the substrate vessel, and free HNCO is released from the zeolite surface. The released HNCO leaves the substrate vessel through an outlet and control valve.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of storing HNCO in stable form comprising the steps of contacting a substrate with gaseous HNCO at a temperature above about 450° F., and maintaining the temperature above about 450° F. until HNCO is bonded to the substrate.

2. The method of claim 1, wherein said substrate is an ion exchange resin.

3. The method of claim 1, wherein said substrate is a precious metal.

4. The method of claim 1, wherein said substrate is a molecular sieve.

5. The method of claim 1, wherein said substrate is a zeolite.

6. The method of claim 1, wherein said substrate is activated charcoal.

7. A method according to claim 1 and further including the step of cooling said HNCO after it has bonded to said substrate.

8. A method of storing HNCO in stable form comprising the steps of contacting a substrate with liquid HNCO at a temperature below ambient temperature, and subsequently causing the temperature to move toward ambient temperature until a desired quantity of HNCO is bonded to the substrate.

9. The method of claim 8, wherein said substrate is an ion exchange resin.

10. The method of claim 8, wherein said substrate is a precious metal.

11. The method of claim 8, wherein said substrate is a molecular sieve.

12. The method of claim 8, wherein said substrate is a zeolite.

13. The method of claim 8, wherein said substrate is a activated charcoal.

* * * * *